US012032196B2

(12) United States Patent  
Nakamura et al.

(10) Patent No.: US 12,032,196 B2  
(45) Date of Patent: Jul. 9, 2024

(54) DISPLAY DEVICE

(71) Applicant: JAPAN DISPLAY INC., Tokyo (JP)

(72) Inventors: Tenfu Nakamura, Tokyo (JP); Kentaro Okuyama, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/223,749

(22) Filed: Jul. 19, 2023

(65) Prior Publication Data

US 2023/0367056 A1 Nov. 16, 2023

Related U.S. Application Data

(63) Continuation of application No. PCT/JP2022/001738, filed on Jan. 19, 2022.

(30) Foreign Application Priority Data

Jan. 21, 2021 (JP) ................. 2021-008034

(51) Int. Cl.
*G02F 1/1343* (2006.01)
*F21V 8/00* (2006.01)
(Continued)

(52) U.S. Cl.
CPC ....... *G02B 6/005* (2013.01); *G02F 1/136286* (2013.01); *G02F 1/13347* (2021.01); *G02F 1/134336* (2013.01); *G02F 1/1368* (2013.01)

(58) Field of Classification Search
CPC ............... G02B 6/005; G02F 1/136286; G02F 1/13347; G02F 1/1368
See application file for complete search history.

(56) References Cited

U.S. PATENT DOCUMENTS 5,751,386 A 5/1998 Kanda et al.
2009/0009689 A1 1/2009 Okuwaki et al.
(Continued)

FOREIGN PATENT DOCUMENTS

JP H08-220536 A 8/1996
JP 2009-038006 A 2/2009
(Continued)

OTHER PUBLICATIONS

International Search Report issued in International Patent Application No. PCT/JP2022/001738 dated Apr. 12, 2022 and English translation of same. 6 pages.

(Continued)

*Primary Examiner* — James A Dudek
(74) *Attorney, Agent, or Firm* — K&L Gates LLP

(57) ABSTRACT

According to one embodiment, a display device includes a first transparent substrate, a second transparent substrate, a liquid crystal layer, a third transparent substrate having a first side surface, a second side surface, and an inner surface, a transparent layer arranged on the inner surface, and light emitting elements. The transparent layer includes a band-shaped portion extending from the first side surface toward the second side surface and a frame-shaped portion formed in a frame shape surrounding the band-shaped portion. The band-shaped portion is separated from the frame-shaped portion. A width of the band-shaped portion on a first side surface side is larger than a width of the band-shaped portion on a second side surface side.

20 Claims, 13 Drawing Sheets

(51) Int. Cl.
*G02F 1/1362* (2006.01)
*G02F 1/1334* (2006.01)
*G02F 1/1368* (2006.01)

(56) References Cited

U.S. PATENT DOCUMENTS

| | | | |
|---|---|---|---|
| 2011/0116013 A1 | 5/2011 | Sano et al. | |
| 2019/0079240 A1* | 3/2019 | Hwang | G02B 6/0035 |
| 2019/0302496 A1 | 3/2019 | Okuyama | |
| 2019/0324305 A1* | 10/2019 | Numata | G02F 1/133512 |
| 2021/0132279 A1 | 5/2021 | Numata et al. | |

FOREIGN PATENT DOCUMENTS

| | | |
|---|---|---|
| JP | 2011-107229 A | 6/2011 |
| JP | 2019-174531 A | 10/2019 |
| JP | 2020-016724 A | 1/2020 |

OTHER PUBLICATIONS

Written Opinion issued in International Patent Application No. PCT/JP2022/001738 dated Apr. 12, 2022. 4 pages.

\* cited by examiner

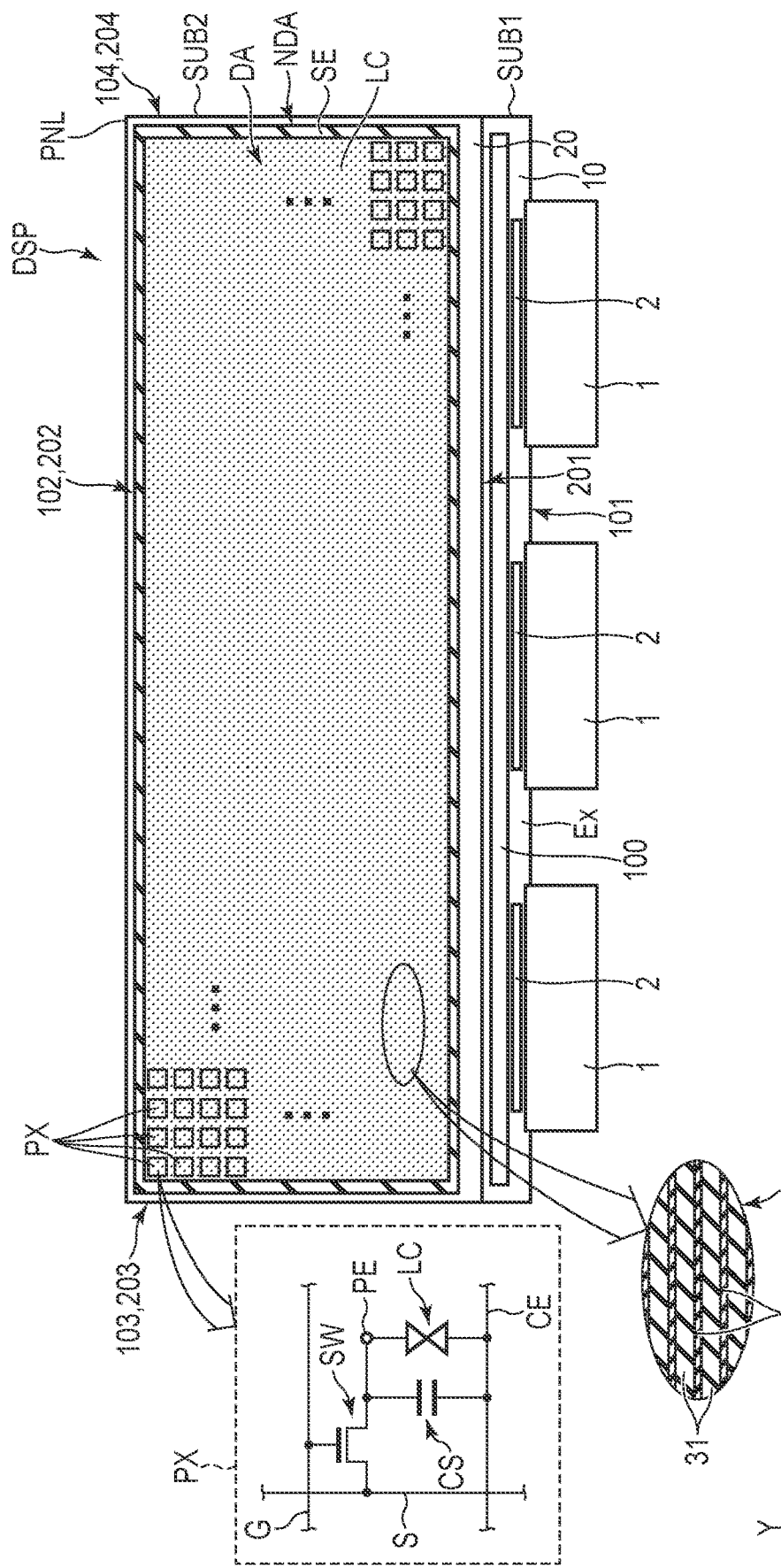
F I G. 1

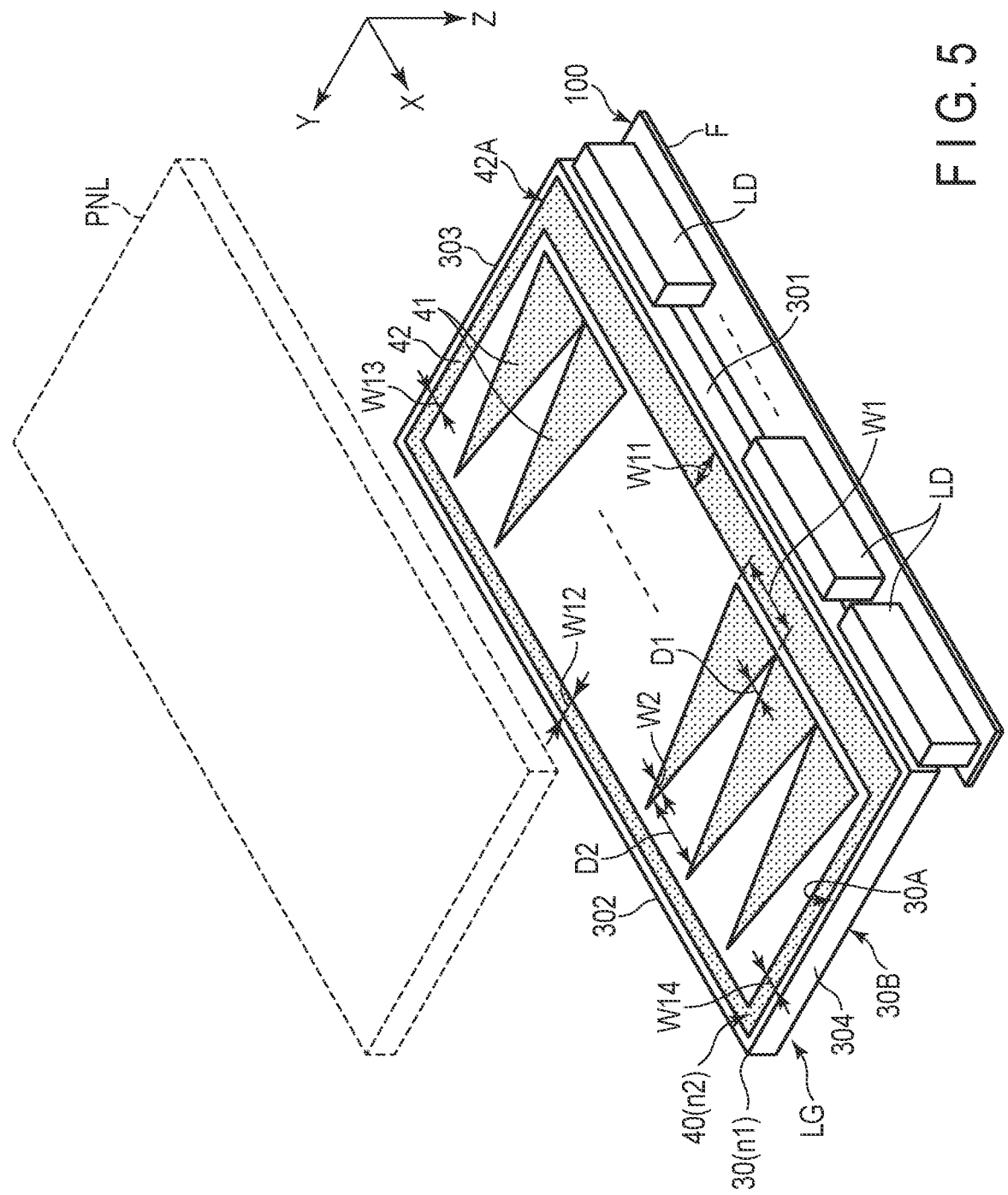
F I G. 5

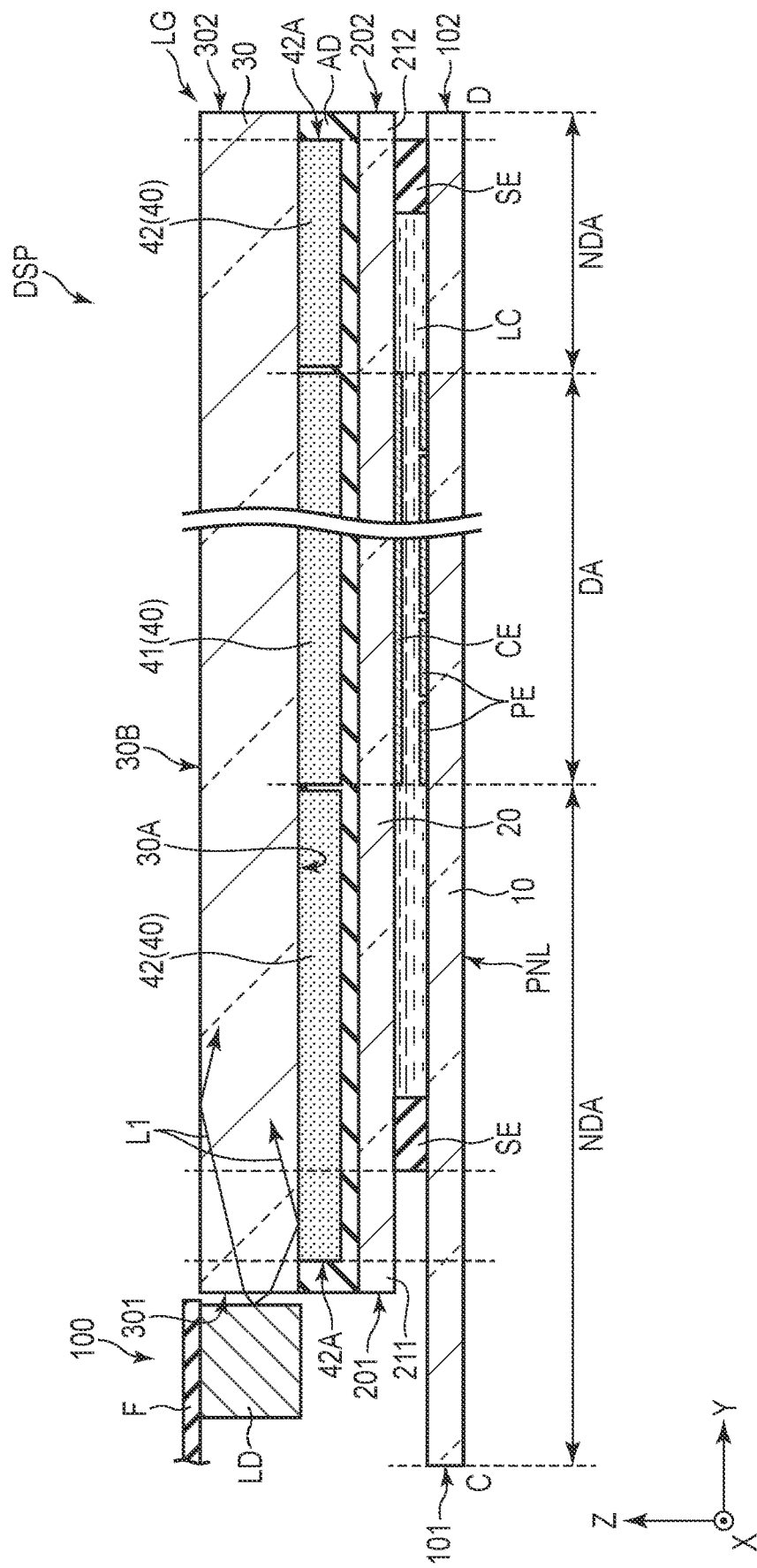
F I G. 9

DISPLAY DEVICE

CROSS-REFERENCE TO RELATED APPLICATIONS

This application is a Continuation Applications of PCT Application No. PCT/JP2022/001738, filed Jan. 19, 2022 and based upon and claiming the benefit of priority from Japanese Patent Application No. 2021-008034, filed Jan. 21, 2021, the entire contents of all of which are incorporated herein by reference.

FIELD

Embodiments described herein relate generally to a display device.

BACKGROUND

In recent years, a device using a polymer dispersed liquid crystal capable of switching a scattered state in which incident light is scattered and a transparent state in which incident light is transmitted has been proposed. As an example, as regards a liquid crystal module comprising a light source at a stepped portion of a light guide overlapping with a liquid crystal panel, a technology of diffusing light from a light source has been disclosed. In addition, as another example, as regards a display device comprising a polarizer between a first display panel and a second display panel, a technique that a liquid crystal layer of the first display panel includes streaky polymers and liquid crystal molecules and an extension direction of the polymers is orthogonal to a transmission axis of the polarizer has been disclosed.

BRIEF DESCRIPTION OF THE DRAWINGS

FIG. 1 is a plan view showing a configuration example of a display device DSP according to the embodiments.

FIG. 5 is an exploded perspective view showing main portions of the display device DSP shown in FIG. 1.

FIG. 9 is a cross-sectional view showing the display device DSP along the second direction Y.

DETAILED DESCRIPTION

Figure 2:
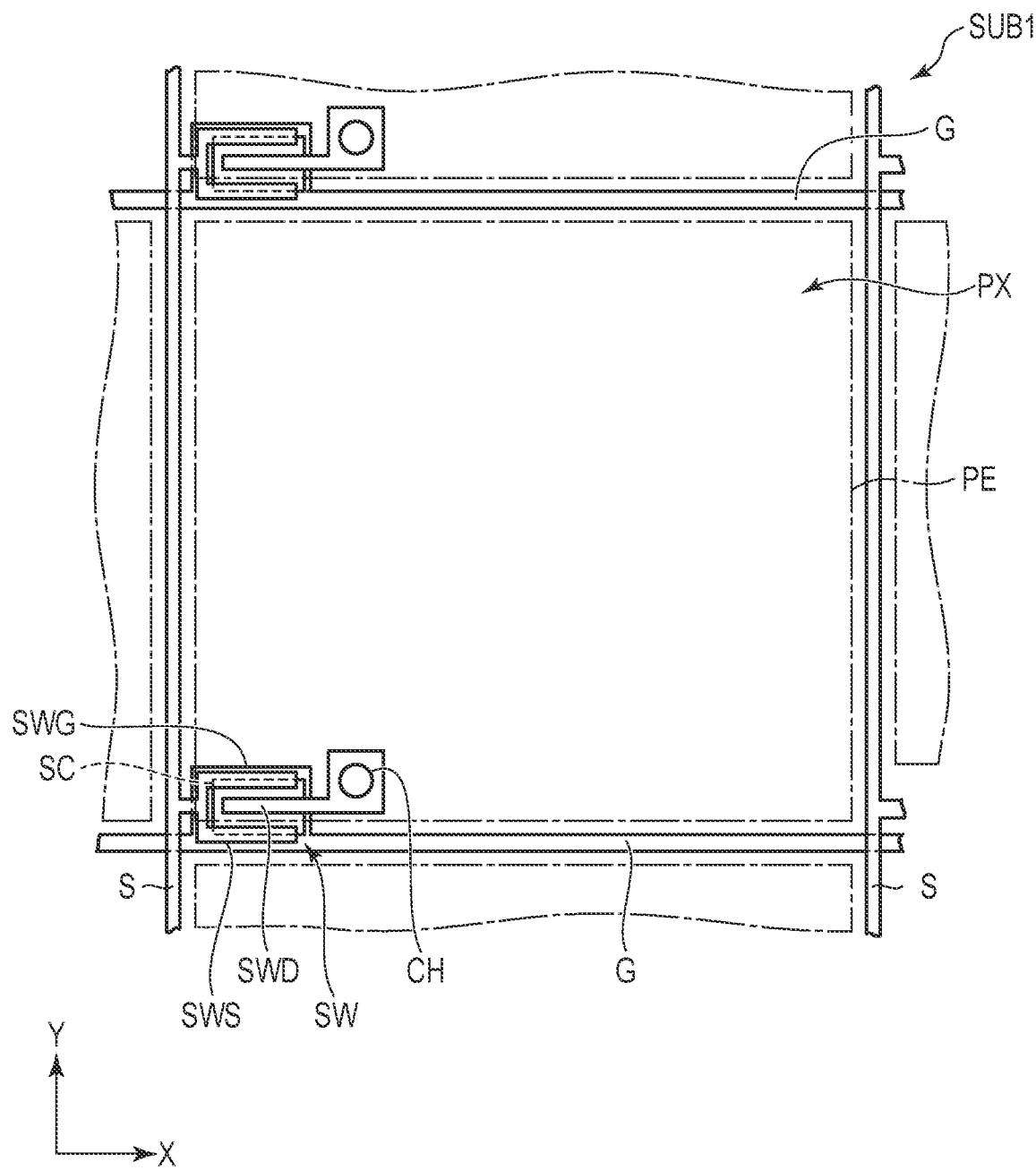
FIG. 2 is a plan view showing an example of a pixel PX shown in FIG. 1.

Embodiments described herein aim to provide a display device capable of improving uniformity in luminance.

In general, according to one embodiment, a display device comprises a first substrate comprising a first transparent substrate, a plurality of pixels on the first transparent substrate, and pixel electrodes each arranged in corresponding one of the plurality of pixels, a second substrate comprising a second transparent substrate, and a common electrode arranged over the plurality of pixels, a liquid crystal layer arranged between the first substrate and the second substrate, and containing streaky polymer and liquid crystal molecules, a third transparent substrate having a first side surface, a second side surface opposed to the first side surface, and an inner surface intersecting the first side surface and the second side surface being opposed to a main surface of the first transparent substrate or a main surface of the second transparent substrate, a transparent layer arranged on the inner surface and having a refractive index lower than a refractive index of the third transparent substrate, and light emitting elements arranged along the first side surface, the transparent layer comprises a band-shaped portion extending from a side of the first side surface toward the second side surface, and a frame-shaped portion formed in a frame shape surrounding the band-shaped portion, the band-shaped portion is separated from the frame-shaped portion, and a width of the band-shaped portion in the side of the first side surface is larger than a width of the band-shaped portion in a side of the second side surface side.

According to another embodiment, a display device comprises a light emitting element, a substrate having a first side surface opposed to the light emitting element, and a second side surface opposite to the first side surface, a plurality of pixels, a liquid crystal layer, and a transparent layer arranged on the substrate and located between the substrate and the liquid crystal layer and having a refractive index lower than a refractive index of the substrate, the transparent layer comprises a band-shaped portion extending from a side of the first side surface toward the second side surface, the plurality of pixels include a first pixel, and a second pixel located between the first pixel and the second side surface, and a first area where the first pixel overlaps with the transparent layer is larger than a second area where the second pixel overlaps with the transparent layer.

According to the embodiments, a display device capable of improving the uniformity in luminance can be provided.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP according to the embodiments. As an example, a first direction X, a second direction Y, and a third direction Z are orthogonal to each other, but may intersect each other at an angle other than 90 degrees. The first direction X and the second direction Y correspond to the directions parallel to the main surface of a substrate constituting the display device DSP, and the third direction Z corresponds to a thickness direction of the display device DSP. In the embodiments, viewing an X-Y plane defined by the first direction X and the second direction Y is referred to as plan view.

In the embodiments, a liquid crystal display device employing polymer dispersed liquid crystal will be described as an example of the display device DSP. The display device DSP comprises a display panel PNL including a polymer dispersed liquid crystal layer (hereinafter simply referred to as a liquid crystal layer LC), a wiring board 1, an IC chip 2, and a light emitting module 100.

The display panel PNL comprises a first substrate SUB1, a second substrate SUB2, a liquid crystal layer LC, and a sealant SE. The first substrate SUB1 and the second substrate SUB2 are formed in a flat plate shape parallel to the X-Y plane. The first substrate SUB1 and the second substrate SUB2 overlap in plan view. The first substrate SUB1 and the second substrate SUB2 are bonded to each other by a sealant SE. The liquid crystal layer LC is held between the first substrate SUB1 and the second substrate SUB2, and is sealed by the sealant SE.

As enlarged and schematically shown in FIG. 1, the liquid crystal layer LC contains polymer 31 and liquid crystal molecules 32. As an example, the polymer 31 is liquid crystalline polymer. The polymer 31 is formed in a stripe shape extending along the first direction X and is arranged in the second direction Y. The liquid crystal molecules 32 are dispersed in gaps of the polymer 31 and aligned such that their long axes extend along the first direction X. Each of the polymer 31 and the liquid crystal molecules 32 has optical anisotropy or refractive anisotropy. The response performance of the polymer 31 to the electric field is lower than the response performance of the liquid crystal molecules 32 to the electric field.

As an example, the alignment direction of the polymer 31 is hardly varied irrespective of the presence or absence of the electric field. In contrast, the alignment direction of the liquid crystal molecules 32 is varied in accordance with the electric field in a state in which a voltage higher than or equal to a threshold value is applied to the liquid crystal layer LC. In a state in which the voltage is not applied to the liquid crystal layer LC (initial alignment state), optical axes of the polymer 31 and the liquid crystal molecules 32 are parallel to each other and the light made incident on the liquid crystal layer LC is almost transmitted through the liquid crystal layer LC (transparent state). In a state in which a voltage is applied to the liquid crystal layer LC, the alignment direction of the liquid crystal molecules 32 changes, and the optical axes of the respective polymer 31 and liquid crystal molecules 32 intersect with each other. Therefore, the light made incident on the liquid crystal layer LC is scattered in the liquid crystal layer LC (scattered state).

The display panel PNL comprises a display portion DA which displays an image and a non-display portion NDA in a frame shape surrounding the display portion DA. The sealant SE is located at the non-display portion NDA. The display portion DA comprises a plurality of pixels PX arranged in a matrix in the first direction X and the second direction Y.

As shown and enlarged in FIG. 1, each pixel PX comprises a switching element SW, a pixel electrode PE, a common electrode CE, a liquid crystal layer LC, and the like. The switching element SW is constituted by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is provided commonly to a plurality of pixel electrodes PE. Each of the pixel electrodes PE is opposed to the common electrode CE in the third direction Z. The liquid crystal layer LC (particularly, liquid crystal molecules 32) is driven by an electric field produced between the pixel electrode PE and the common electrode CE. A capacitor CS is formed between, for example, an electrode having the same electric potential as the common electrode CE and an electrode having the same potential as the pixel electrode PE.

The first substrate SUB1 comprises the scanning line G, the signal line S, the switching element SW, and the pixel electrode PE, and the second substrate SUB2 comprises the common electrode CE, which will be described later. On the first substrate SUB1, the scanning line G and the signal line S are electrically connected to the wiring board 1 or the IC chip 2.

The first substrate SUB1 comprises a first transparent substrate 10, and the second substrate SUB2 comprises a second transparent electrode 20. The first transparent substrate 10 has side surfaces 101 and 102 along the first direction X and side surfaces 103 and 104 along the second direction Y. The second transparent substrate 20 has side surfaces 201 and 202 along the first direction X and side surfaces 203 and 204 along the second direction Y. In the configuration example shown in FIG. 1, the side surfaces 102 and 202, the side surfaces 103 and 203, and the side surfaces 104 and 204 overlap, respectively, in plan view, but may not overlap. The side surface 201 is located between the side surface 101 and the display portion DA in plan view. The first substrate SUB1 includes an extending portion Ex between the side surface 101 and the side surface 201. In other words, the extending portion Ex corresponds to a portion of the first substrate SUB1, which does not overlap with the second substrate SUB2.

In the configuration example shown in FIG. 1, the display panel PNL is formed in a rectangular shape extending in the first direction X. In other words, the side surfaces 101 and 102 and the side surfaces 201 and 202 are side surfaces formed along the long sides of the display panel PNL, and the side surfaces 103 and 104 and the side surfaces 203 and 204 are side surfaces formed along the short sides of the display panel PNL. The display panel PNL may be formed in a rectangular shape extending in the second direction Y, a square shape, the other polygonal shape, or the other shape such as a circular shape or an elliptical shape.

The wiring board 1 and the IC chip 2 are mounted on the extending portion Ex. The wiring board 1 is, for example, a flexible printed circuit board which can be bent. The IC chip 2 incorporates, for example, a display driver which outputs a signal necessary for image display, and the like. The IC chip 2 may be mounted on the wiring board 1. In the configuration example shown in FIG. 1, a plurality of wiring boards 1 are applied, but a single wiring board 1 may be applied. In addition, the plurality of IC chips 2 are applied, but a single IC chip 2 may be applied.

Details of the light emitting module 100 will be described later, and the light emitting module 100 is arranged along the side surface (or the substrate side surface) of the display panel PNL. In the configuration example shown in FIG. 1, the light emitting module 100 overlaps with the extending portion Ex in plan view and is arranged along the side surface 201 of the second transparent substrate 20.

The light emitting module 100 may be arranged along the other side surfaces of the display panel PNL, for example, the other side surfaces 102 and 202, the other side surfaces 103 and 203, or the other side surfaces 104 and 204.

In addition, the light emitting module 100 may emit light toward any of the side surfaces of the first transparent substrate 10 and the second transparent substrate 20, the side surfaces of both the first transparent substrate 10 and the second transparent substrate 20, or side surfaces of the other substrate (for example, a third transparent substrate to be described later). However, when the light emitting module 100 is arranged along the side surface 103 or 104, the polymer 31 of the liquid crystal layer LC is formed in a stripe shape extending along the second direction Y and the liquid crystal molecules 32 are aligned such that their long axes extend along the second direction Y.

In addition, the display device DSP may comprise a plurality of light emitting modules. For example, the display device DSP may comprise the other light emitting module arranged along the side surfaces 102 and 202 in addition to the light emitting module 100 shown in FIG. 1.

FIG. 2 is a plan view showing an example of a pixel PX shown in FIG. 1. The first substrate SUB1 comprises a plurality of scanning lines G, a plurality of signal lines S, a switching element SW, and a pixel electrode PE represented by a one-dot chain line.

The plurality of scanning lines G are arranged at intervals in the second direction Y. The plurality of signal lines S intersect the plurality of scanning lines G and are arranged at intervals in the first direction X. The direction of extension of the scanning lines G is referred to as the first direction X, and the direction of extension of the signal lines S is referred to as the second direction Y. In the present specification, the pixel PX corresponds to an area defined by two adjacent scanning lines G and two adjacent signal lines S.

The switching element SW is arranged at an intersection of the scanning line G and the signal line S. The switching element SW comprises a semiconductor layer SC. The semiconductor layer SC overlaps with a gate electrode SWG integrated with the scanning line G. Each of a source electrode SWS integrated with the signal line S, and a drain electrode SWD is electrically connected to the semiconductor layer SC. The pixel electrode PE is arranged between the adjacent scanning lines G, and between the adjacent signal lines S. The pixel electrode PE overlaps with the drain electrode SWD, and is electrically connected to the switching element SW through a contact hole CH.

Figure 3:
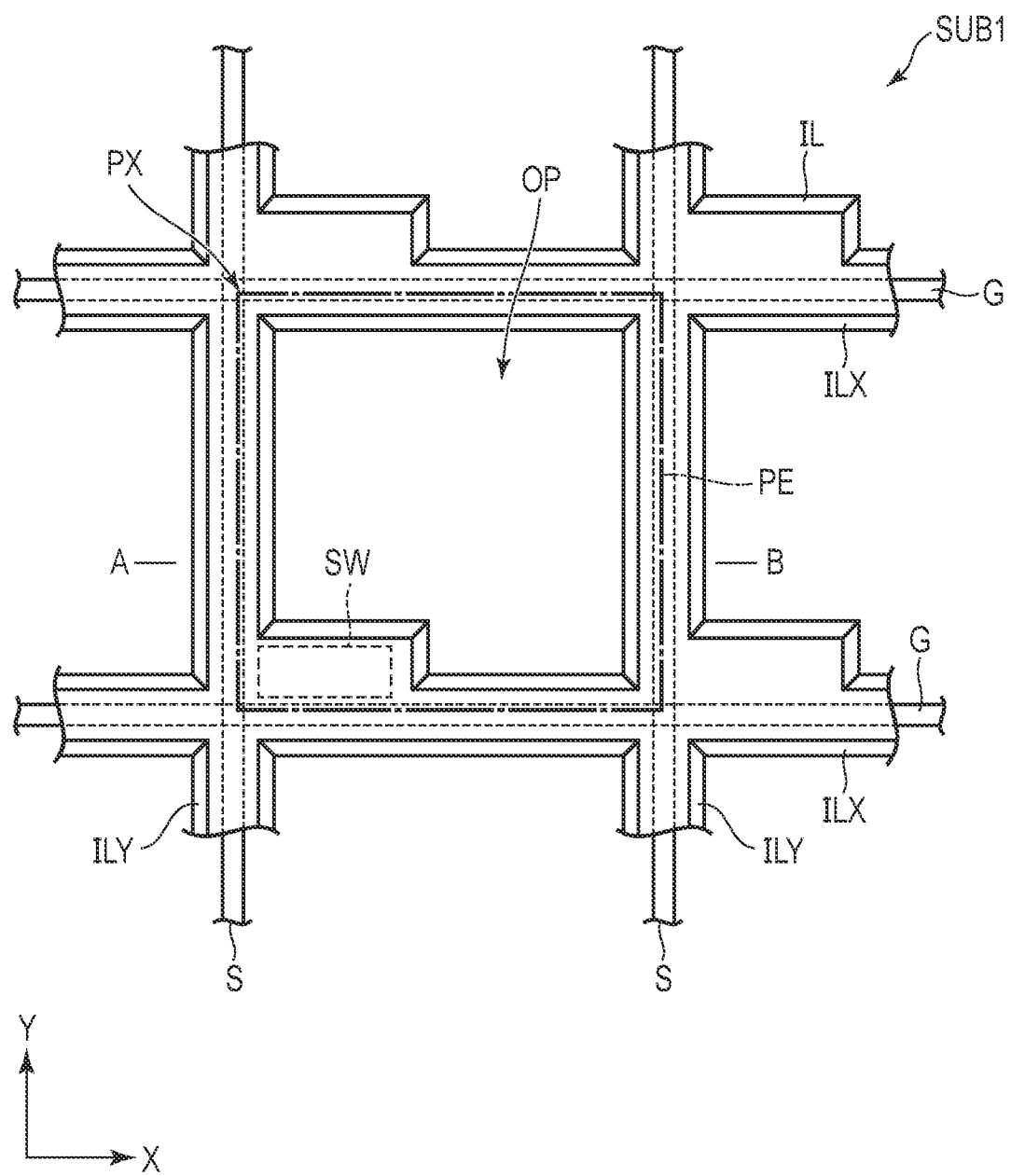
FIG. 3 is a plan view showing an example of an insulating film IL arranged on the first substrate SUB1 shown in FIG. 2.

FIG. 3 is a plan view showing an example of an insulating film IL arranged on the first substrate SUB1 shown in FIG. 2. The insulating film IL is formed in a grating pattern which defines an opening OP in each pixel PX. In other words, the insulating film IL includes parts ILX extending along the first direction Y and parts ILY extending along the second direction Y. The insulating film IL overlaps with each of the scanning lines G, the signal lines S, and the switching element SW. The pixel electrode PE represented by a one-dot chain line is arranged to overlap with the opening OP. A peripheral portion of the pixel electrode PE overlaps with the parts ILX and the parts ILY. The insulating film IL is, for example, an organic insulating film, but may be an inorganic insulating film.

Figure 4:
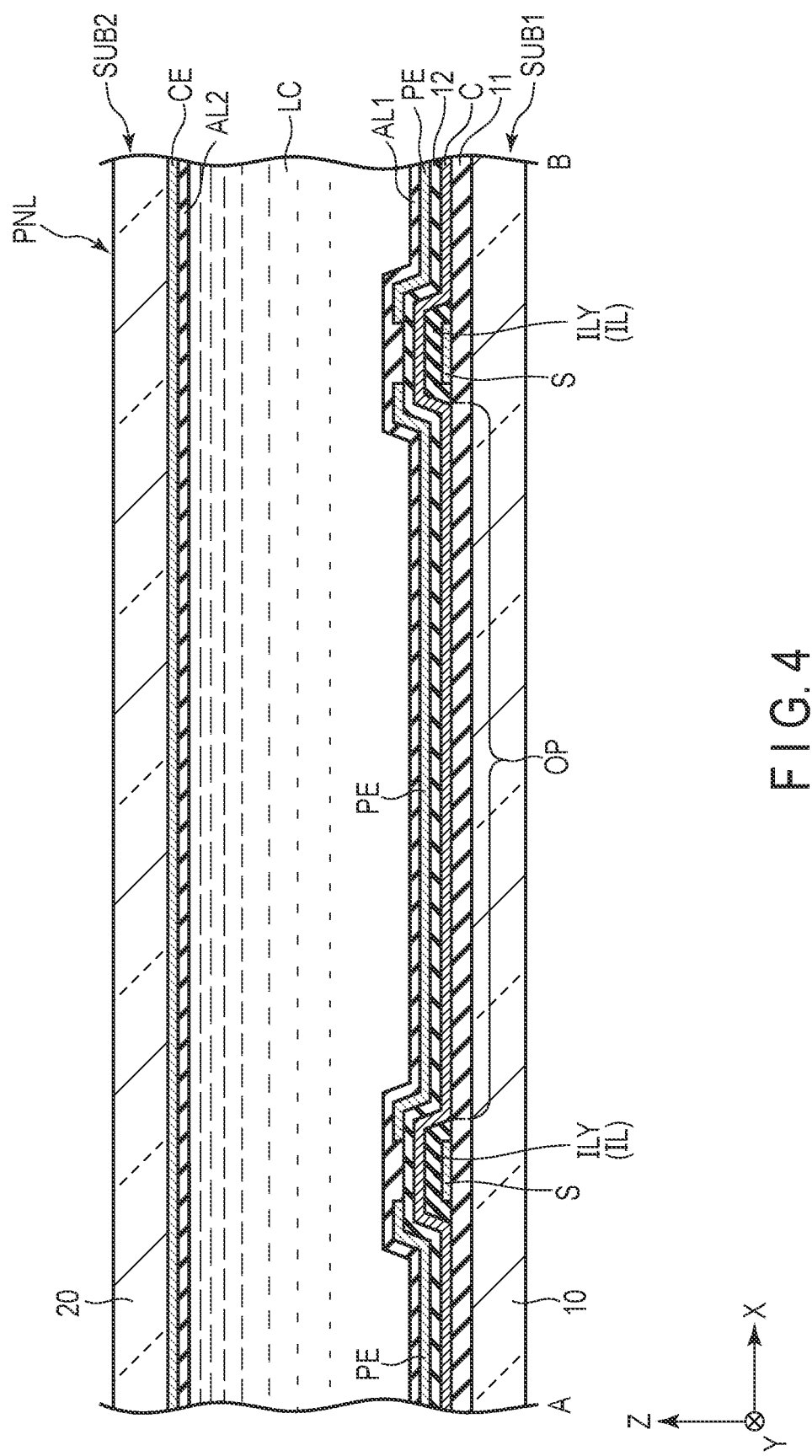
FIG. 4 is a cross-sectional view showing an example of the display panel PNL including the first substrate SUB1 shown in FIG. 3.

FIG. 4 is a cross-sectional view showing an example of the display panel PNL including the first substrate SUB1 shown in FIG. 3. FIG. 4 corresponds to a cross-sectional view along line A-B shown in FIG. 3.

The first substrate SUB1 comprises the first transparent substrate 10, insulating films 11 and 12, the signal lines S, the insulating film IL, a capacitive electrode C, the pixel electrode PE, and an alignment film AL1. The insulating film 11 is arranged on the first transparent substrate 10. The scanning lines G shown in FIG. 3 and the like are arranged between the first transparent substrate 10 and the insulating film 11. The signal lines S are arranged on the insulating film 11 and covered with the parts ILY of the insulating film IL. The capacitive electrode C is arranged on the insulating film 11 at the opening OP and covered with the insulating film 12. In addition, the capacitive electrode C is arranged on the parts ILY and opposed to the signal lines S with the parts ILY sandwiched therebetween. The pixel electrode PE is arranged on the insulating film 12 at the opening OP and covered with the alignment film AL1. The pixel electrodes PE are opposed to the capacitive electrode C with the insulating film 13 sandwiched therebetween to form the capacitance CS of the pixel PX. The capacitive electrode C may include an opening overlapping with a part of the pixel electrode PE. The contact hole CH shown in FIG. 2 penetrates the insulating film 12. The alignment film AL1 is in contact with the liquid crystal layer LC.

The second substrate SUB2 comprises a second transparent substrate 20, a common electrode CE, and an alignment film AL2. The common electrode CE is arranged on a side of the second transparent substrate 20, which is opposed to the first substrate SUB1, and is covered with the alignment film AL2. In the second substrate SUB2, a light-shielding layer may be provided directly above each of the switching elements SW, the scanning lines G, and the signal lines S. In addition, a transparent insulating film may be arranged between the second transparent substrate 20 and the common electrode CE or between the common electrode CE and the alignment film AL2. The common electrode CE is opposed to the plurality of pixel electrodes PE with the liquid crystal layer LC sandwiched therebetween. In addition, the common electrode CE is electrically connected to the capacitive electrode C and has the same electric potential as the capacitive electrode C. The alignment film AL2 is in contact with the liquid crystal layer LC.

The liquid crystal layer LC is arranged between the first substrate SUB1 and the second substrate SUB2.

The first transparent substrate 10 and the second transparent substrate 20 are insulating substrates such as glass substrates or plastic substrates. The insulating film 11 is, for example, a transparent inorganic insulating film of silicon oxide, silicon nitride, silicon oxynitride or the like. The insulating film IL is, for example, a transparent organic insulating film of an acrylic resin or the like. The insulating film 12 is, for example, a transparent inorganic insulating film of silicon nitride or the like. The capacitive electrode C, the pixel electrodes PE, and the common electrode CE are transparent electrodes formed of a transparent conductive material such as indium tin oxide (ITO) or indium zinc oxide (IZO). The alignment films AL1 and AL2 are, for example, horizontal alignment films having an alignment restriction force along the X-Y plane. As an example, the alignment films AL1 and AL2 are subjected to an alignment treatment along the first direction X. The alignment treatment may be a rubbing treatment or an optical alignment treatment.

FIG. 5 is an exploded perspective view showing main portions of the display device DSP shown in FIG. 1. The display device DSP comprises a light guide element LG in addition to the display panel PNL represented by a dotted line. The light guide element LG comprises a third transparent substrate 30 and a transparent layer 40. The light guide element LG is opposed to the display panel PNL in the third direction Z.

The third transparent substrate 30 is an insulating substrate such as a glass substrate or a plastic substrate and has a refractive index n1. As an example, the third transparent substrate 30 is not a member obtained by bonding a plurality of substrates, but a single substrate. The third transparent substrate 30 has an inner surface 30A, an outer surface 30B on a side opposite to the inner surface 30A, and side surfaces 301 to 304. The inner surface 30A and the outer surface 30B are surfaces substantially parallel to the X-Y plane. The inner surface 30A faces the display panel PNL. The side surface 301 corresponds to a first side surface, and the side surface 302 corresponds to a second side surface on a side opposite to the first side surface. The inner surface 30A intersects the side surface 301 and the side surface 302.

In the configuration example shown in FIG. 5, the third transparent substrate 30 is formed in a rectangular shape extending in the first direction X, similarly to the display panel PNL. In other words, the side surfaces 301 and 302 are side surfaces formed along the long sides of the third transparent substrate 30 and extend in the first direction X. In addition, the side surfaces 303 and 304 are side surfaces formed along the short sides of the third transparent substrate 30 and extend in the second direction Y.

The transparent layer 40 is arranged on the inner surface 30A. The transparent layer 40 has a refractive index n2. The refractive index n2 is lower than the refractive index n1 (n1>n2). The transparent layer 40 includes a plurality of band-shaped portions 41 arranged in the first direction X, and a frame-shaped portion 42 surrounding the plurality of band-shaped portions 41.

Each of the band-shaped portions 41 extends in the second direction Y. Alternatively, the band-shaped portions 41 extend to be tapered from the side surface 301 side toward the side surface 302 side. In other words, as regards a width W of the band-shaped portions 41 along the first direction X, a width W1 on the side surface 301 side is larger than a width W2 on the side surface 302 side (W1>W2). For this reason, as regards an interval D between the adjacent band-shaped portions 41 along the first direction X, an interval D1 on the side surface 301 side is smaller than an interval D2 on the side surface 302 side (D2>D1). The adjacent band-shaped portions 41 may be in contact with each other or separated from each other on the side surface 301 side.

The frame-shaped portion 42 is formed in a frame shape continuously extending along the side surfaces 301 to 304. An outer edge 42A of the frame-shaped portion 42 is located on the inside of the side surfaces 301 to 304. In the configuration example shown in FIG. 5, as regards a width of each part of the frame-shaped portion 42, a width W11 of a part along the side surface 301 is larger than a width W12 of a part along the side surface 302, a width W13 of a part along the side surface 303, and a width W14 of a part along the side surface 304. The widths W12 to W14 may be equal to each other or different from each other. The width of the frame-shaped portion 42 corresponds to a length in a direction orthogonal to the direction of extension of each part.

Each of the band-shaped portions 41 is separated from the frame-shaped portion 42. The inner surface 30A is exposed from the transparent layer 40, at a position between the adjacent band-shaped portions 41 (particularly, on the side surface 302 side) and between the band-shaped portions 41 and the frame-shaped portion 42.

The transparent substrate 30 is formed of, for example, glass, an organic material such as polymethyl methacrylate (PMMA), or polycarbonate (PC). The transparent layer 40 is formed of, for example, an organic material such as siloxane-based resin or fluorine-based resin. The refractive index n1 of the third transparent substrate 30 is approximately 1.5, and the refractive index n2 of the transparent layer 40 is approximately 1.0 to 1.4. The third transparent substrate 30 is bonded to the display panel PNL (first transparent substrate 10 or second transparent substrate 20) with the transparent layer 40 sandwiched therebetween, by a transparent adhesive layer AD to be described later.

The light emitting module 100 comprises a plurality of light emitting elements LD and a wiring board F. Each of the light emitting elements LD is electrically connected to the wiring board F. The plurality of light emitting elements LD are arranged at intervals along the first direction X, and face the side surface 301 in the second direction Y. The light emitting elements LD are, for example, light emitting diodes. The light emitting element LD comprises a red light emitting portion, a green light emitting portion, and a blue light emitting portion, which are not described in detail. The light emitting elements LD emit light toward the side surface 301, and the emitted light travels along a direction of an arrow which represents the second direction Y.

Figure 6:
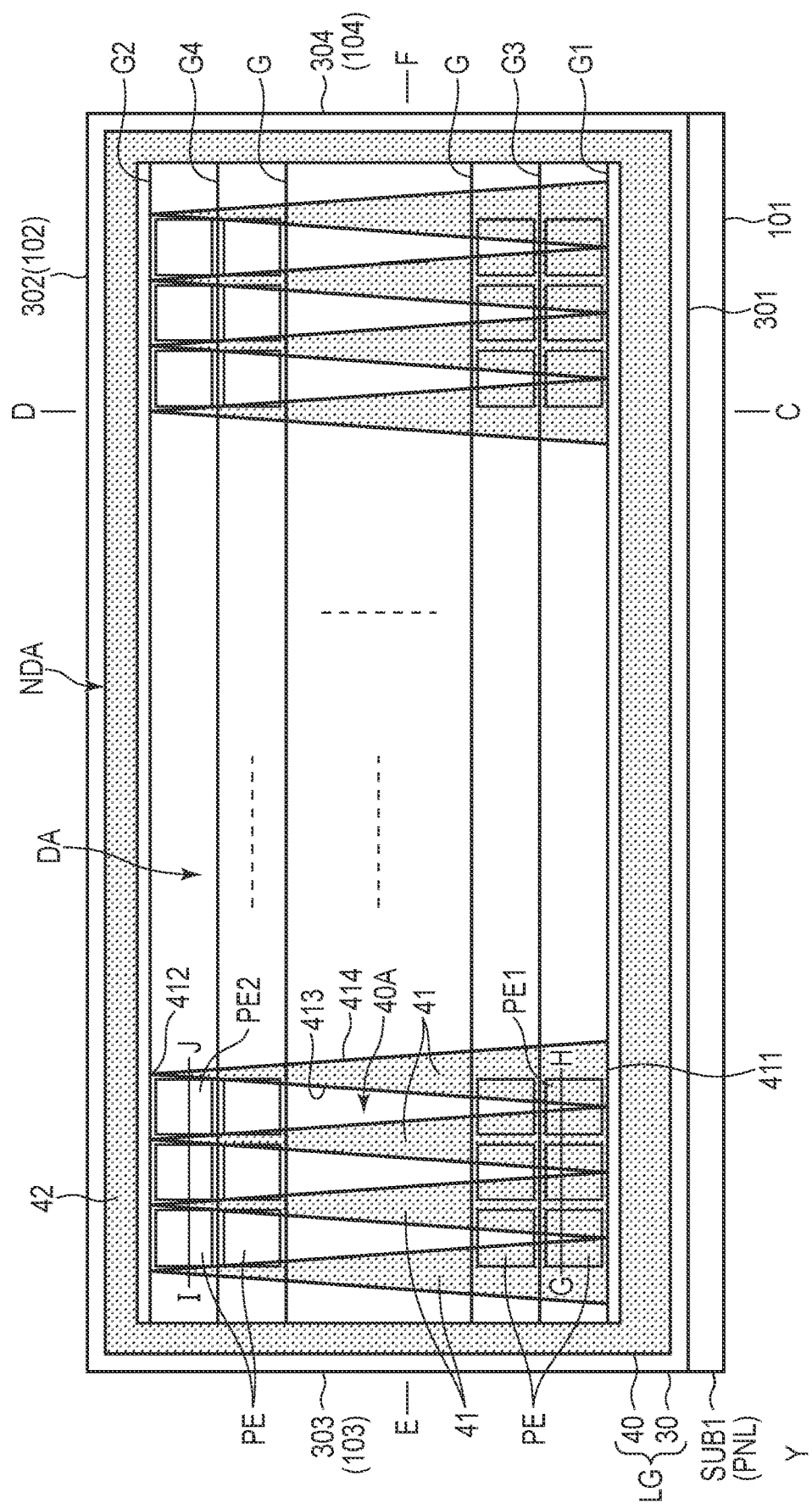
FIG. 6 is a plan view showing a state in which the light guide element LG shown in FIG. 5 and the display panel PNL overlap.

FIG. 6 is a plan view showing a state in which the light guide element LG shown in FIG. 5 and the display panel PNL overlap. Main portions of the first substrate SUB1, of the display panel PNL, are illustrated in the figure.

The band-shaped portion 41 includes a first edge 411 on the side surface 301 side, a second edge 412 on the side surface 302 side, and edges 413 and 414. The first edge 411 extends in the first direction X. The edges 413 and 414 extend in a direction different from the first direction X and the second direction Y. In the configuration example shown in FIG. 6, the band-shaped portion 41 is formed in a triangular shape in which the first edge 411 is referred to as a base, the second edge 412 is referred to as a vertex, and the edges 413 and 414 are referred to as oblique sides. Each of the plurality of band-shaped portions 41 arranged in the first direction X is formed in the same triangular shape. The first edges 411 of the adjacent band-shaped portions 41 are in contact with each other, but may be separated from each other.

The edges 413 and 414 may be formed in a linear shape or a curved shape. In addition, the band-shaped portion 41 may not be formed in a triangular shape, but formed in the other polygonal shape.

A relationship between the main portions of the first substrate SUB1 and each portion of the transparent layer 40 will be particularly focused in a state in which the light guide element LG and the display panel PNL overlap. The plurality of band-shaped portions 41 overlap with the display portion DA, and the frame-shaped portion 42 overlaps with the non-display portion NDA, in plan view.

The first substrate SUB1 comprises a plurality of scanning lines G and a plurality of pixel electrodes PE, on the inner side surrounded by the frame-shaped portion 42. The plurality of scanning lines G are arranged at regular intervals in the second direction Y. The plurality of pixel electrodes PE are arranged at regular intervals in each of the first direction X and the second direction Y.

The plurality of scanning lines G include a first scanning line G1 that is the closest to the frame-shaped portion 42 on the side surface 301 side, a second scanning line G2 that is the closest to the frame-shaped portion 42 on the side surface 302 side, a scanning line G3 that is adjacent to the first scanning line G1, and a scanning line G4 that is adjacent to the second scanning line G2. The plurality of pixel electrodes PE include a first pixel electrode PE1 that is the closest to the frame-shaped portion 42 on the side surface 301 side, and a second pixel electrode PE2 that is the closest to the frame-shaped portion 42 on the side surface 302 side.

The first pixel electrode PE1 is located between the first scanning line G1 and the scanning line G3. The second pixel electrode PE2 is located between the scanning line G4 and the second scanning line G2. The first scanning line G1 is located between the frame-shaped portion 42 and the first pixel electrode PE1 on the side surface 301 side. The second scanning line G2 is located between the second pixel electrode PE2 and the frame-shaped portion 42 on the side surface 302 side.

Either of the first scanning line G1 and the second scanning line G2 may be a dummy line which is not related to the control of the switching elements located at the display portion DA. For example, when the first scanning line G1 is electrically connected to the switching element which controls the first pixel electrode PE1, the switching element which controls the second pixel electrode PE2 is electrically connected to the scanning line G4, and the second scanning line G2 corresponds to the dummy line.

Each of the band-shaped portions 41 intersects the plurality of scanning lines G and the plurality of pixel electrodes PE. Each of the pixel electrodes PE overlaps with two adjacent band-shaped portions 41. In other words, one band-shaped portion 41 is arranged to extend over two pixel electrodes PE adjacent in the first direction X. In addition, each of the pixel electrodes PE overlaps with an aperture 40A of the transparent layer 40 where the transparent layer 40 does not exist. The aperture 40A corresponds to an area exposed from a gap between the adjacent band-shaped portions 41 or from the transparent layer 40 of the inner surface 30A.

The first pixel electrode PE1 and the second pixel electrode PE2 will be focused at the display portion DA. An area where the first pixel electrode PE1 overlaps with the band-shaped portion 41 is larger than an area where the second pixel electrode PE2 overlaps with the band-shaped portion 41. In addition, an area where the first pixel electrode PE1 overlaps with the aperture 40A is smaller than an area where the second pixel electrode PE2 overlaps with the aperture 40A. An area overlapping with the transparent layer 40 including the band-shaped portions 41 corresponds to an area where the light from the light emitting elements LD is hardly made incident, and an area overlapping with the aperture 40A corresponds to an area where the light from the light emitting elements LD can be made incident, which will be described later.

Figure 7:
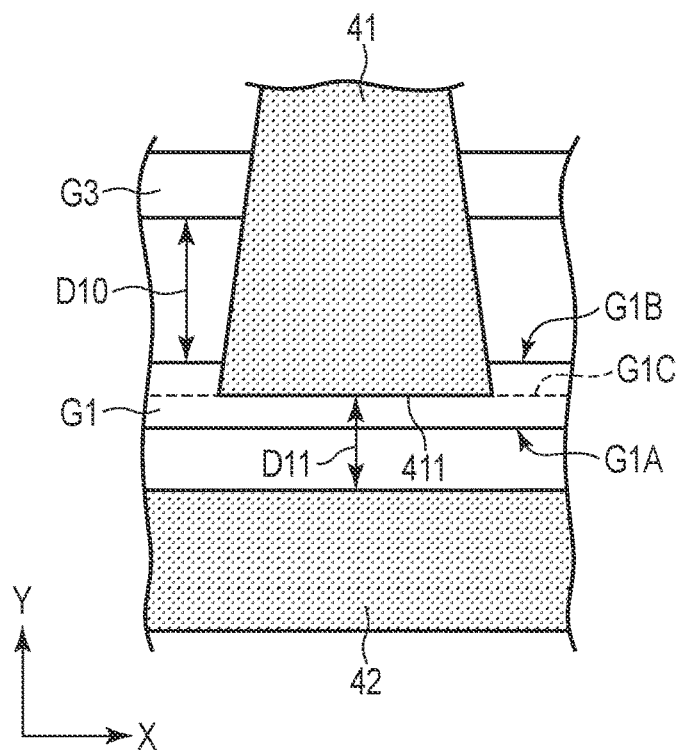
FIG. 7 is an enlarged plan view showing a first edge 411 of a band-shaped portion 41.

FIG. 7 is an enlarged plan view showing a first edge 411 of a band-shaped portion 41. The first edge 411 overlaps with the first scanning line G1. In other words, the first scanning line G1 has edges G1A and G1B along the first direction X. A center line G1C of the first scanning line G1 is located equidistantly from each of the edges G1A and G1B. The first edge 411 extending in the first direction X is located between the edge G1A and the edge G1B. In addition, the first edge 411 may overlap with the center line G1C.

In the second direction Y, an interval D11 between the first edge 411 and the frame-shaped portion 42 is smaller than an interval D10 between the adjacent scanning lines G1 and G3.

Figure 8:
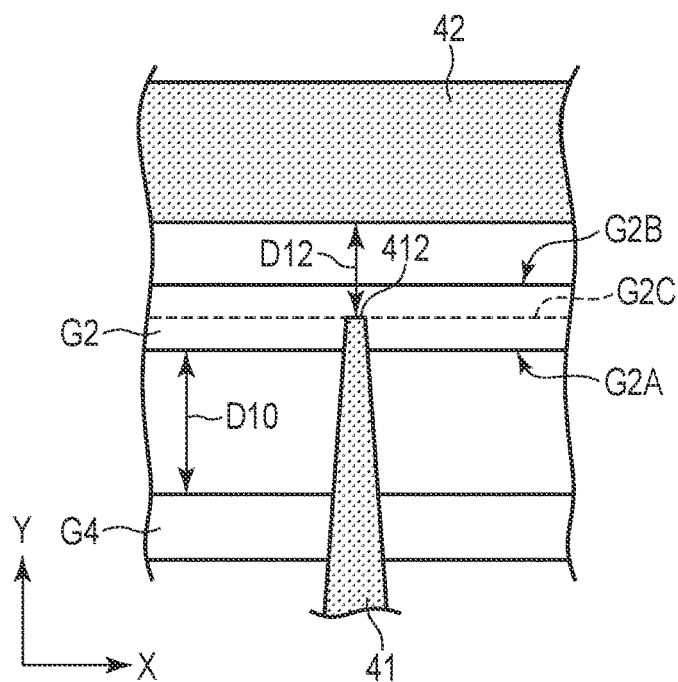
FIG. 8 is an enlarged plan view showing a second edge 412 of the band-shaped portion 41.

FIG. 8 is an enlarged plan view showing a second edge 412 of the band-shaped portion 41. The second edge 412 overlaps with the second scanning line G2. In other words, the second scanning line G2 has edges G2A and G2B along the first direction X. A center line G2C of the second scanning line G2 is located equidistantly from each of the edges G2A and G2B. The second edge 412 is located between the edge G2A and the edge G2B. In addition, the second edge 412 may overlap with the center line G2C. The second edge 412 may overlap with the scanning line G4.

In the second direction Y, an interval D12 between the second edge 412 and the frame-shaped portion 42 is smaller than an interval D10 between the adjacent scanning lines G2 and G4.

FIG. 9 is a cross-sectional view showing the display device DSP along the second direction Y. FIG. 9 corresponds to a cross-sectional view taken along line C-D shown in FIG. 6. Only main parts of the display panel PNL are illustrated in the figure.

The configuration example shown in FIG. 9 corresponds to an example in which the third transparent substrate 30 is bonded to the second transparent substrate 20 by the transparent adhesive layer AD. In other words, the inner surface 30A is opposed to the second transparent substrate 20 in the third direction Z. The transparent layer 40 including the band-shaped portion 41 and the frame-shaped portion 42 is located between the second transparent substrate 20 and the third transparent substrate 30 and is in contact with the inner surface 30A. The transparent adhesive layer AD is in contact with a substantially entire surface of the second transparent substrate 20 and covers the transparent layer 40. The transparent adhesive layer AD is in contact with the inner surface 30A, at a position between the outer edge 42A of the frame-shaped portion 42 and the side surface 301, between the outer edge 42A and the side surface 302, and between the band-shaped portion 41 and the frame-shaped portion 42.

The sealant SE overlaps with the frame-shaped portion 42 in the third direction Z. The second transparent substrate 20 includes a first portion 211 extending from the sealant SE toward the side surface 301, and a second portion 212 extending from the sealant SE toward the side surface 302, in the second direction Y. The side surface 301 is located directly above the side surface 201. The first portion 211 corresponds to an area between the side surface 201 and the sealant SE, of the second transparent substrate 20. The side surface 302 is located directly above the side surfaces 102 and 202. The second portion 212 corresponds to an area between the side surface 202 and the sealant SE, of the second transparent substrate 20.

The frame-shaped portion 42 overlaps with the liquid crystal layer LC, the sealant SE, and the first portion 211, on the side surface 301 side. In addition, the transparent adhesive layer AD between the outer edge 42A and the side surface 301 overlaps with the first portion 211. An air layer is interposed between the first portion 211 and the first transparent substrate 10.

The frame-shaped portion 42 overlaps with the liquid crystal layer LC and the sealant SE without overlapping with the second portion 212, on the side surface 302 side. In addition, the transparent adhesive layer AD between the outer edge 42A and the side surface 302 overlaps with the second portion 212. An air layer is interposed between the second portion 212 and the first transparent substrate 10.

The plurality of pixel electrodes PE, the liquid crystal layer LC, and the common electrode CE overlap with the band-shaped portion 41 in the third direction Z, at the display portion DA. A dummy pixel electrode which does not contribute to the display may be arranged at the non-display portion NDA, but its illustration is omitted.

A refractive index of each of the first transparent substrate 10, the second transparent substrate 20, and the transparent adhesive layer AD is equivalent to the refractive index n1 of the third transparent substrate 30, and higher than the refractive index n2 of the transparent layer 40. In this example, "equivalent" is not limited to a case where the difference in refractive index is zero, but indicates a case where the difference in refractive index is 0.03 or less.

In the light emitting module 100, the light emitting element LD is opposed to the side surface 301 in the second direction Y. In the configuration example shown in FIG. 9, the light emitting element LD is opposed to the side surface 301 without being opposed to the side surface 201, but may be opposed to both the side surface 201 and the side surface 301.

Next, the light emitted from the light emitting element LD will be described with reference to FIG. 9.

The light emitting element LD emits light L1 toward the side surface 301. Since the air layer exists between the light emitting element LD and the side surface 301, the light L1 emitted from the light emitting element LD is refracted on the side surface 301 and made incident on the third transparent substrate 30. The light traveling from the third transparent substrate 30 toward the transparent layer 40, of the light L1 made incident on the third transparent substrate 30, is reflected on an interface between the third transparent substrate 30 and the transparent layer 40. In addition, the light traveling toward the outer surface 30B, of the light L1 made incident on the third transparent substrate 30, is reflected on an interface between the third transparent substrate 30 and the air layer.

Thus, the light L1 travels inside the third transparent substrate 30 while repeatedly reflected, in an area where the transparent layer 40 exists.

The light traveling toward the area where the transparent layer 40 does not exist (aperture 40A shown in FIG. 6), i.e., the area where the third transparent substrate 30 is in contact with the transparent adhesive layer AD, of the traveling light L1, is emitted from the inner surface 30A of the third transparent substrate 30 and transmitted through the second transparent substrate 20 via the transparent adhesive layer AD. In other words, part of the light L1 is made incident on the display panel PNL.

Incidence of the light L1 from the light emitting element LD on the display panel PNL is suppressed in the area close to the light emitting element LD (side surface 301 side), while incidence of the light L1 on the display panel PNL is promoted in the area remote from the light emitting element LD (side surface 302 side). In the area close to the light emitting element LD, all the light L1 is not made incident on the display panel PNL, but the light L1 can be made incident on the display panel PNL from the gap between the adjacent band-shaped portions 41 as shown in FIG. 6.

The light L1 made incident on the display panel PNL is transmitted through the pixel in the transparent state (i.e., the pixel in which a potential difference between the pixel electrode PE and the common electrode CE is less than a threshold value) and is scattered in the pixel in the scattered state (i.e., the pixel in which the potential difference between the pixel electrode PE and the common electrode CE is larger than or equal to the threshold value).

Thus, the display device DSP in which the light guide element LG is bonded to the second transparent substrate 20 can be observed from the first transparent substrate 10 side and can also be observed from the third transparent substrate 30 side. In addition, the display device DSP is a so-called transparent display, and the background of the display device DSP can be observed through the display device DSP even in a case of observing from the first transparent substrate 10 side or observing from the third transparent substrate 30 side.

Figure 10:
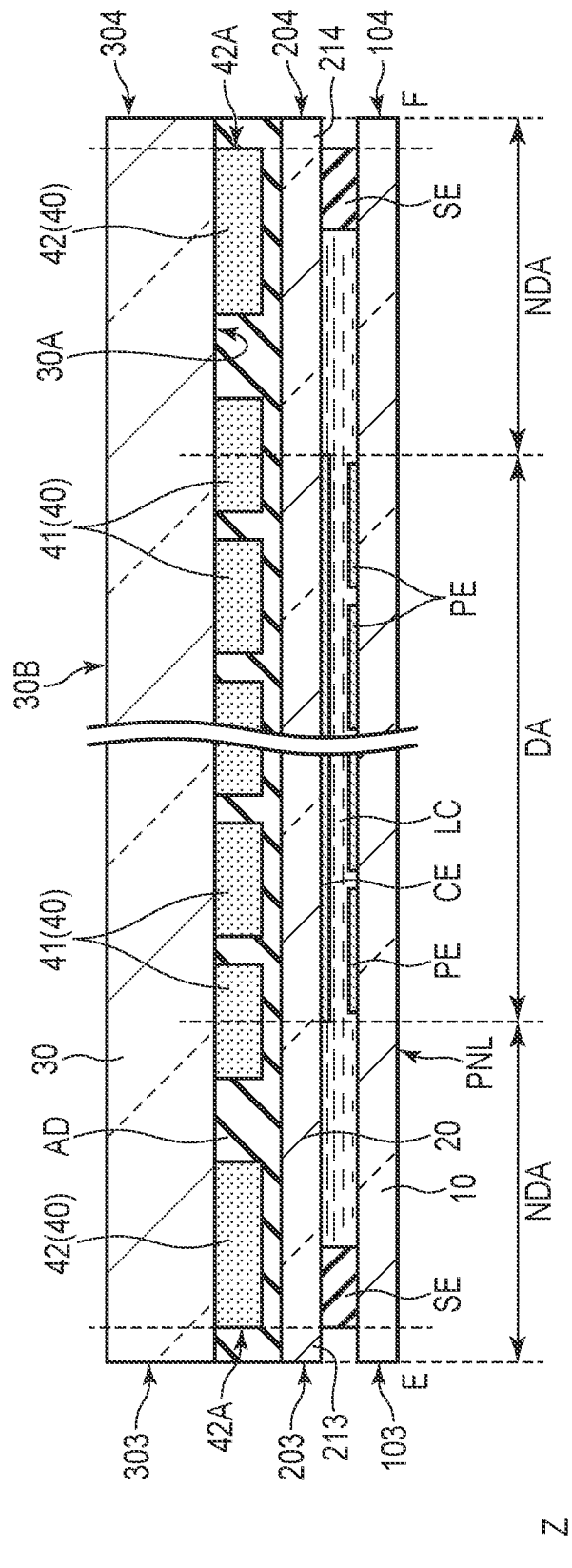
FIG. 10 is a cross-sectional view showing the display device DSP along a first direction X.

FIG. 10 is a cross-sectional view showing the display device DSP along a first direction X. FIG. 10 corresponds to a cross-sectional view taken along line E-F shown in FIG. 6. Only main parts of the display panel PNL are illustrated in the figure.

The sealant SE overlaps with the frame-shaped portion 42 in the third direction Z. The second transparent substrate 20 includes a third portion 213 extending from the sealant SE toward the side surface 303, and a fourth portion 214 extending from the sealant SE toward the side surface 304, in the first direction X. The side surface 303 is located directly above the side surfaces 103 and 203. The third portion 213 corresponds to an area between the side surface 203 and the sealant SE, of the second transparent substrate 20. The side surface 304 is located directly above the side surfaces 104 and 204. The fourth portion 214 corresponds to an area between the side surface 204 and the sealant SE, of the second transparent substrate 20.

The frame-shaped portion 42 overlaps with the liquid crystal layer LC and the sealant SE without overlapping with the third portion 213, on the side surface 303 side. In addition, the transparent adhesive layer AD between the outer edge 42A and the side surface 303 overlaps with the third portion 213. An air layer is interposed between the third portion 213 and the first transparent substrate 10.

The frame-shaped portion 42 overlaps with the liquid crystal layer LC and the sealant SE without overlapping with the fourth portion 214, on the side surface 304 side. In addition, the transparent adhesive layer AD between the outer edge 42A and the side surface 304 overlaps with the fourth portion 214. An air layer is interposed between the fourth portion 214 and the first transparent substrate 10.

As regards the light L1 from the light emitting elements LD, suppression of the incidence and promotion of the incidence, on the display panel PNL, will be described with reference to FIG. 11 and FIG. 12.

Figure 11:
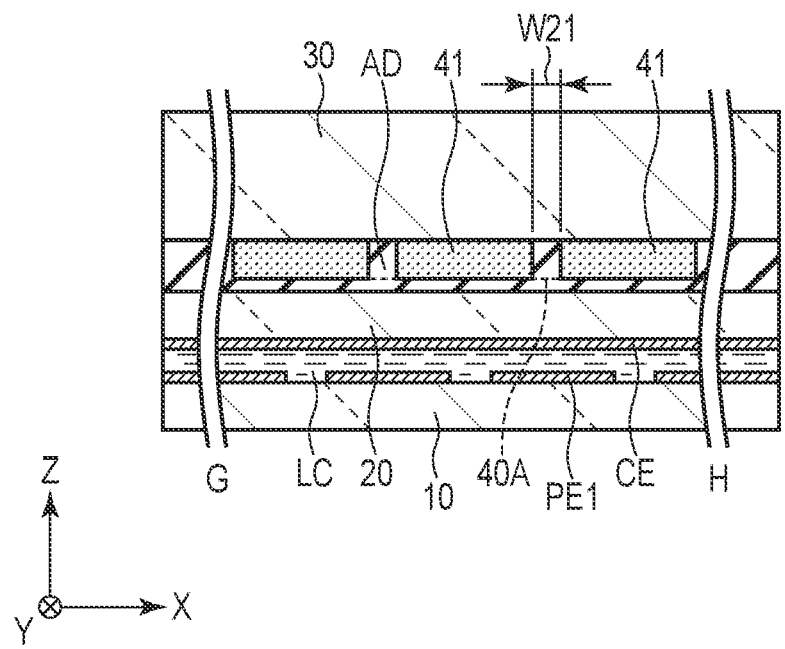
FIG. 11 is a cross-sectional view showing the display device DSP including the first pixel electrode PE1.

FIG. 11 is a cross-sectional view showing the display device DSP including the first pixel electrode PE1. FIG. 11 corresponds to a cross-sectional view taken along line G-H shown in FIG. 6.

The first pixel electrode PE1 overlaps with two band-shaped portions 41 in the third direction Z. In addition, the first pixel electrode PE1 overlaps with the aperture 40A in the third direction Z. The aperture 40A has a width W21 along the first direction X. The width W21 corresponds to the interval between the adjacent band-shaped portions 41.

Figure 12:
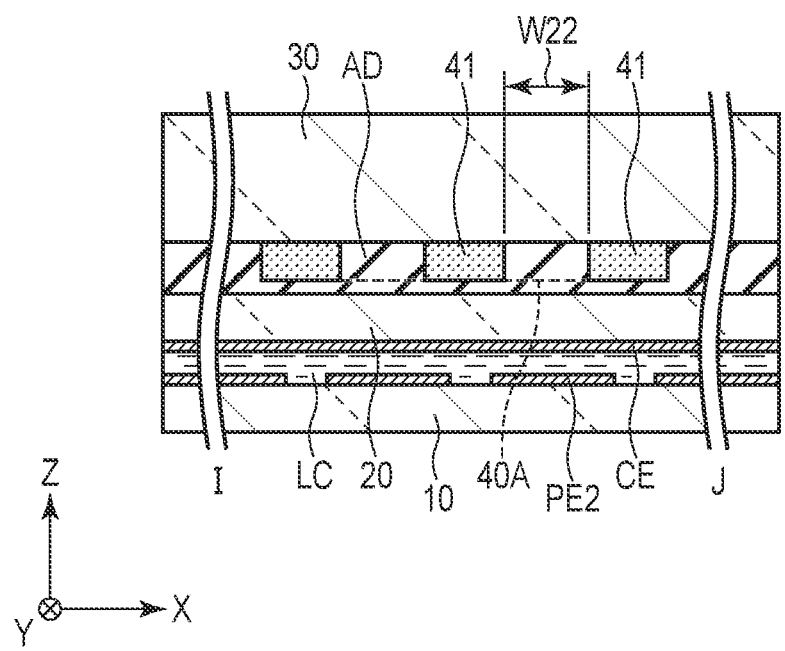
FIG. 12 is a cross-sectional view showing the display device DSP including the second pixel electrode PE2.

FIG. 12 is a cross-sectional view showing the display device DSP including the second pixel electrode PE2. FIG. 12 corresponds to a cross-sectional view taken along line I-J shown in FIG. 6.

The second pixel electrode PE2 overlaps with two band-shaped portions 41 in the third direction Z. In addition, the second pixel electrode PE2 overlaps with the aperture 40A in the third direction Z. The aperture 40A has a width W22 along the first direction X. The width W22 is larger than the width W21. In other words, an area of the band-shaped portion 41 which overlaps with the second pixel electrode PE2 is smaller than an area of the band-shaped portion 41 which overlaps with the first pixel electrode PE1.

The light L1 propagating through the third transparent substrate 30 along the second direction Y is totally reflected on the interface between the third transparent substrate 30 and the transparent layer 40 so as to be able to be made incident on the liquid crystal layer LC at the aperture 40A, as described above. For this reason, the incidence of the light L1 on the liquid crystal layer LC between a comparatively small aperture 40A and the first pixel electrode PE1 is suppressed, and the incidence of the light L1 on the liquid crystal layer LC between a comparatively large aperture 40A and the second pixel electrode PE2 is promoted.

The amount of illumination of the light L1 made incident on the liquid crystal layer LC on the first pixel electrode PE1 will be compared with the amount of illumination of the light L1 made incident on the liquid crystal layer LC on the second pixel electrode PE2. The luminance of the light L1 in the area close to the light emitting element LD is referred to as first luminance, and the luminance of the light L1 in the area remote from the light emitting element LD is referred to as second luminance. Since the light L1 from the light emitting element LD is attenuated as the light travels farther from the light emitting element LD, the second luminance is lower than the first luminance.

As described above, the area where the first pixel electrode PE1 overlaps with the transparent layer 40 is larger than the area where the second pixel electrode PE2 overlaps with the transparent layer 40. In addition, the area of the aperture 40A in which the light L1 can be made incident on the first pixel electrode PE1 is smaller than the area of the aperture 40A in which the light L1 can be made incident on the second pixel electrode PE2. In contrast, the first luminance of the light L1 which can be made incident on the first pixel electrode PE1 is higher than the second luminance of the light L1 which can be made incident on the second pixel electrode PE2. For this reason, the amounts of illumination on the first pixel electrode PE1 and the second pixel electrode PE2 can be made equal to each other.

Thus, according to the embodiments, the area of the transparent layer 40 which overlaps with the pixel electrode PE becomes larger, and the incidence on the display panel PNL is suppressed, in the area close to the side surface 301. In contrast, the area of the transparent layer 40 which overlaps with the pixel electrode PE becomes smaller, and the incidence on the display panel PNL is promoted, in the area close to the side surface 302.

In addition, at the display portion DA, the area in which each of the pixel electrodes PE arranged in the second direction Y overlaps with the transparent layer 40 is optimized in accordance with the reduction in the luminance of the light L1 along the second direction Y. Therefore, the amount of illumination per pixel electrode PE can be made uniform over an almost entire area of the display portion DA. In other words, uniformity in in-plane luminance of the display device DSP can be improved. The degradation in display quality caused by the non-uniformity in the illumination light can be thereby suppressed.

In addition, according to the embodiments, the band-shaped portions 41 of the transparent layer 40 are separated from the frame-shaped portion 42. For this reason, each of the band-shaped portions 41 can be processed in a desired shape when patterning the transparent layer 40. In addition, the non-uniformity in luminance caused by variation in the shape of the band-shaped portions 41 can be suppressed.

Furthermore, according to the embodiments, the outer edge 42A of the frame-shaped portion 42 is located on an inner side than each of the side surfaces 301 to 304 of the third transparent substrate 30. For this reason, when the third transparent substrate 30 is cut after patterning the transparent layer 40, cutting can be smoothly executed without being affected by the transparent layer 40.

In addition, the transparent adhesive layer AD exists but the transparent layer 40 does not exist, between the outer edge 42A and the side surfaces 301 to 304. In the area where this transparent layer 40 does not exist, however, an air layer is interposed between the first transparent substrate 10 and the second transparent substrate 20. For this reason, the light L1 which has reached the second transparent substrate 20 through the transparent adhesive layer AD is reflected on an interface between the second transparent substrate 20 and the air layer. In other words, leakage of the light L1 to the outside can be suppressed and the loss of light can be suppressed.

In addition, according to the embodiments, since the frame-shaped portion 42 of the transparent layer 40 is arranged at the non-display portion NDA, incidence of the light L1 toward various lines and the sealant located at the non-display portion NDA can be suppressed. For this reason, undesired scattering at the non-display portion NDA, and the loss of light caused by undesired absorption are suppressed.

Figure 13:
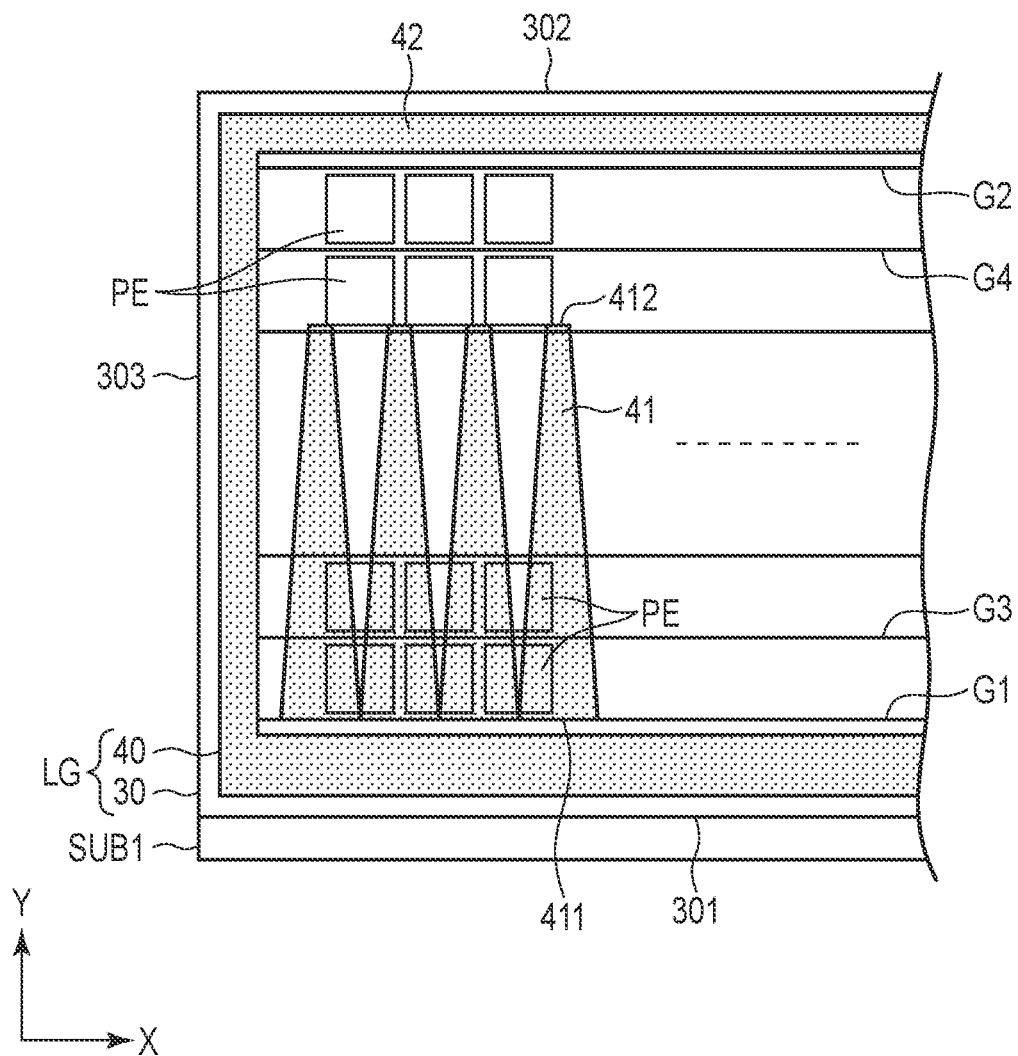
FIG. 13 is a plan view showing another configuration example in which the light guide element LG and main portions of the first substrate SUB1 overlap.

FIG. 13 is a plan view showing another configuration example in which the light guide element LG and main portions of the first substrate SUB1 overlap.

The configuration example shown in FIG. 13 is different from the configuration example shown in FIG. 6 in that each of the band-shaped portions 41 is formed in a trapezoidal shape. In other words, each of the first edge 411 and the second edge 412 extends in the first direction X. The first edge 411 corresponds to a trapezoidal lower base, and the second edge 412 corresponds to a trapezoidal upper base. In this configuration example, too, the same advantages as those of the above-described configuration example can be obtained.

Figure 14:
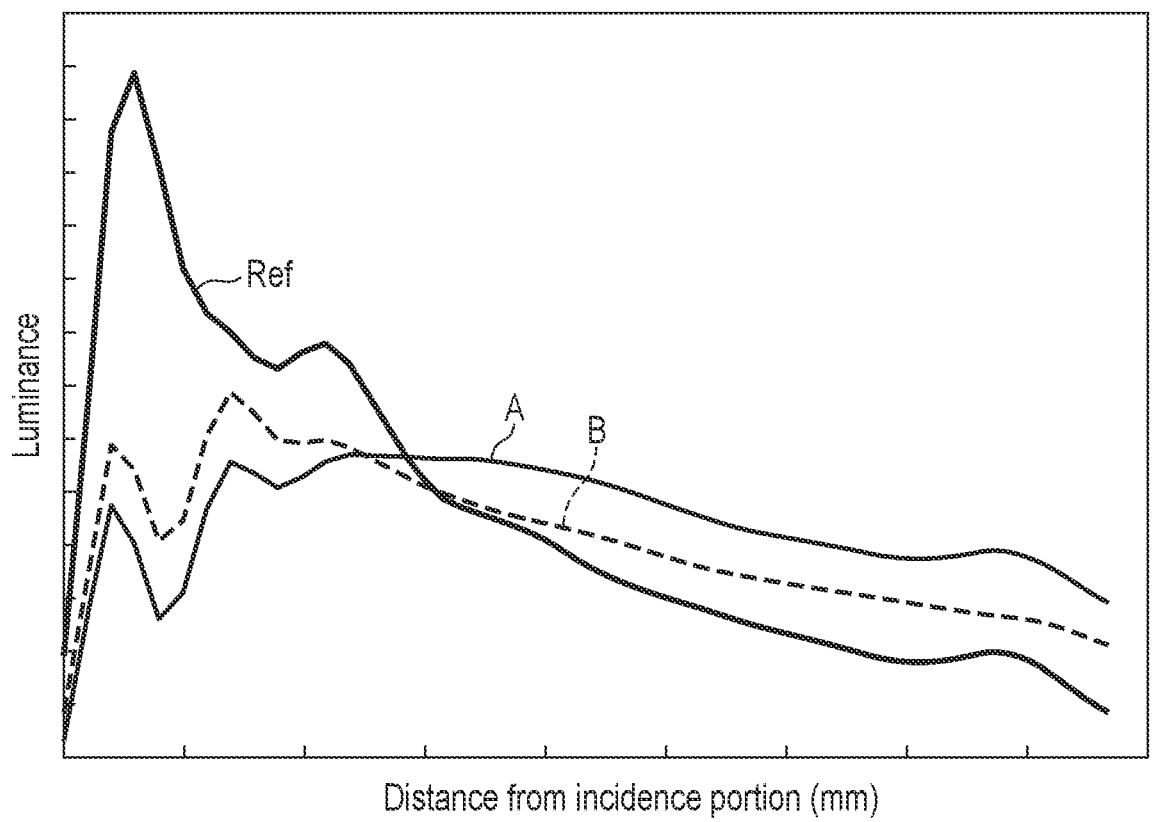
FIG. 14 is a graph showing a relationship between a distance from the incidence portion and the luminance.

FIG. 14 is a graph showing a relationship between a distance from the incidence portion and the luminance. A horizontal axis in the graph indicates a distance along the second direction Y from the side surface 301 which is the incidence portion. A longitudinal axis in the graph indicates a scattering luminance in a case where all the pixels PX are set in a scattered state.

A line indicated by Ref in the graph corresponds to a comparative example in which the light guide element LG not comprising transparent layer 40 is applied. A peak of the luminance appears in the vicinity of the side surface 301, and the luminance rapidly lowers as the position is separated from the side surface 301. It has been confirmed that a large difference in luminance is made between the vicinity of the side surface 301 and the vicinity of the side surface 302.

A line indicated by A in the graph corresponds to a configuration example in which the light guide element LG comprising the triangular band-shaped portions 41 as shown in FIG. 6 is applied. A line indicated by B in the graph corresponds to a configuration example in which the light guide element LG comprising the trapezoidal band-shaped portions 41 as shown in FIG. 13 is applied. In any of the cases, the large luminance peak does not appear in the vicinity of the side surface 301, and the rapid reduction in luminance is suppressed. Then, it has been confirmed that the difference in luminance between the vicinity of the side surface 301 and the vicinity of the side surface 302 is more reduced than that in the comparative example.

Figure 15:
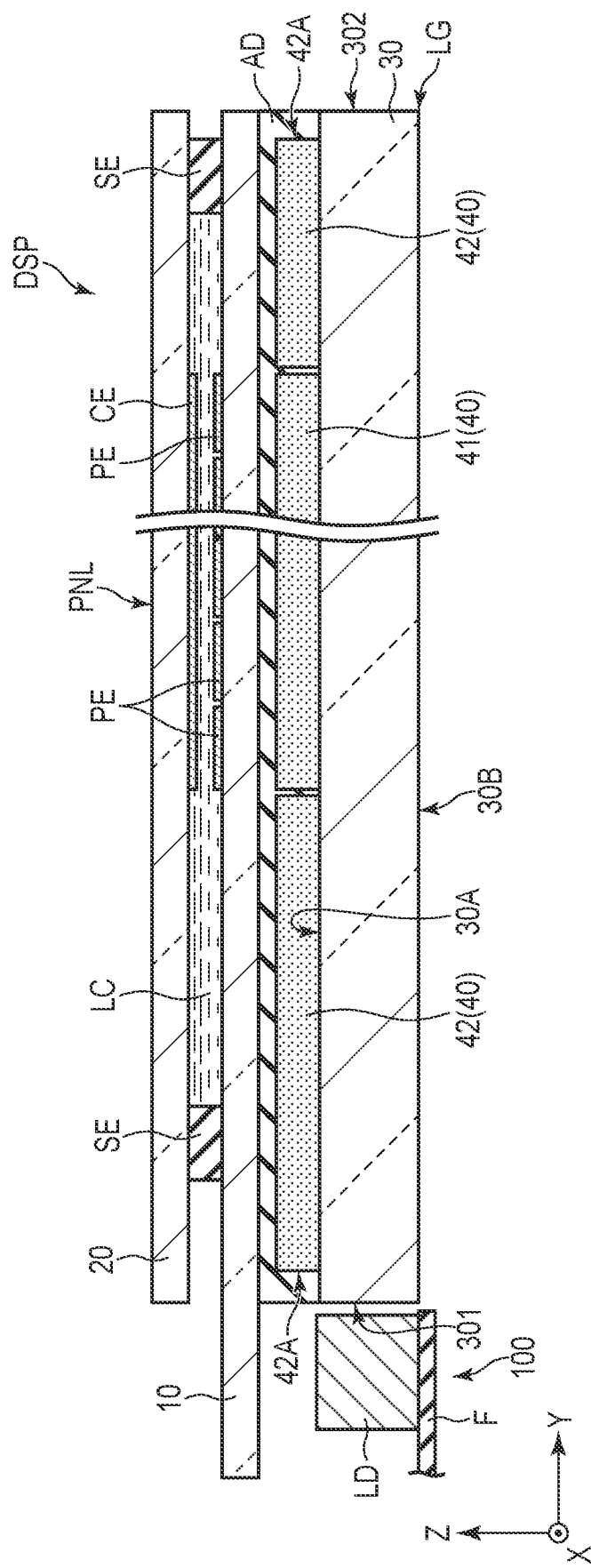
FIG. 15 is a cross-sectional view showing the display device DSP in another configuration example along the second direction Y.

FIG. 15 is a cross-sectional view showing the display device DSP in another configuration example along the second direction Y. FIG. 15 corresponds to a cross-sectional view taken along line C-D shown in FIG. 6. Only main parts of the display panel PNL are illustrated in the figure.

The configuration example shown in FIG. 15 corresponds to an example in which the third transparent substrate 30 is bonded to the first transparent substrate 10 by the transparent adhesive layer AD. In other words, the inner surface 30A is opposed to the first transparent substrate 10 in the third direction Z. The transparent layer 40 including the band-shaped portion 41 and the frame-shaped portion 42 is located between the first transparent substrate 10 and the third transparent substrate 30 and is in contact with the inner surface 30A. The transparent adhesive layer AD is in contact with a substantially entire surface of the first transparent substrate 10 and covers the transparent layer 40. The transparent adhesive layer AD is in contact with the inner surface 30A, at a position between the outer edge 42A of the frame-shaped portion 42 and the side surface 301, between the outer edge 42A and the side surface 302, and between the band-shaped portion 41 and the frame-shaped portion 42.

Thus, the display device DSP in which the light guide element LG is bonded to the first transparent substrate 10 can be observed from the second transparent substrate 20 side and can also be observed from the third transparent substrate 30 side. In addition, the background of the display device DSP can be observed through the display device DSP even when the display device DSP is observed from the second transparent substrate 20 side or observed from the third transparent substrate 30 side.

In this configuration example, too, the same advantages as those of the above-described configuration example can be obtained.

As explained above, according to the embodiments, a display device capable of improving the uniformity in luminance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising a first transparent substrate, a plurality of pixels on the first transparent substrate, and pixel electrodes each arranged in corresponding one of the plurality of pixels;
a second substrate comprising a second transparent substrate, and a common electrode arranged over the plurality of pixels;
a liquid crystal layer arranged between the first substrate and the second substrate, and containing streaky polymer and liquid crystal molecules;
a third transparent substrate having a first side surface, a second side surface opposed to the first side surface, and an inner surface intersecting the first side surface and the second side surface and being opposed to a main surface of the first transparent substrate or a main surface of the second transparent substrate;
a transparent layer arranged on the inner surface and having a refractive index lower than a refractive index of the third transparent substrate; and
light emitting elements arranged along the first side surface, wherein
the transparent layer comprises a band-shaped portion extending from a side of the first side surface toward the second side surface, and a frame-shaped portion formed in a frame shape surrounding the band-shaped portion,
the band-shaped portion is separated from the frame-shaped portion, and
a width of the band-shaped portion in the side of the first side surface is larger than a width of the band-shaped portion in a side of the second side surface side.

2. The display device of claim 1, wherein
the first substrate comprises a plurality of scanning lines on an inner side surrounded by the frame-shaped portion, in plan view,
each of the plurality of scanning lines extends in a first direction, and the scanning lines are arranged in a second direction intersecting the first direction,
the band-shaped portion includes a first edge in the side of the first side surface, and
in the second direction, an interval between the first edge and the frame-shaped portion is smaller than an interval between two of the scanning lines, the two being adjacent to each other.

3. The display device of claim 2, wherein
the plurality of scanning lines include a first scanning line that is the closest to the first side surface, and
the first edge overlaps with the first scanning line.

4. The display device of claim 1, wherein
the first substrate comprises a plurality of scanning lines on an inner side surrounded by the frame-shaped portion, in plan view,
each of the plurality of scanning lines extends in a first direction, and the scanning lines are arranged in a second direction intersecting the first direction,
the band-shaped portion includes a second edge in the side of the second side surface, and
in the second direction, an interval between the second edge and the frame-shaped portion is smaller than an interval between two of the scanning lines, the two being adjacent to each other.

5. The display device of claim 4, wherein
the plurality of scanning lines include a second scanning line that is the closest to the second side surface, and
the second edge overlaps with the second scanning line.

6. The display device of claim 1, wherein
the band-shaped portion has a base in the side of the first side surface and a vertex in the side of the second side surface, and is formed in a triangular shape.

7. The display device of claim 1, wherein
an outer edge of the frame-shaped portion is located inside the first side surface and the second side surface in plan view.

8. The display device of claim 7, further comprising:
a transparent adhesive layer covering the transparent layer, wherein
the transparent adhesive layer is in contact with the inner surface between the outer edge and the first side surface and between the outer edge and the second side surface.

9. The display device of claim 8, wherein
the transparent adhesive layer is bonded to the second transparent substrate.

10. The display device of claim 8, wherein
the transparent adhesive layer is bonded to the first transparent substrate.

11. The display device of claim 7, further comprising:
a sealant which bonds the first substrate with the second substrate and seals the liquid crystal layer, wherein
the second transparent substrate includes a first portion extending from the sealant toward the first side surface, and
the frame-shaped portion overlaps with the sealant and the first portion in plan view.

12. The display device of claim 7, further comprising:
a sealant which bonds the first substrate with the second substrate and seals the liquid crystal layer, wherein
the second transparent substrate includes a second portion extending from the sealant toward the second side surface, and
the frame-shaped portion overlaps with the sealant without overlapping with the second portion in plan view.

13. The display device of claim 1, wherein
the plurality of pixels include a first pixel, and a second pixel located between the first pixel and the second side surface, and
a first area where the first pixel overlaps with the transparent layer is larger than a second area where the second pixel overlaps with the transparent layer.

14. The display device of claim 1, wherein
the band-shaped portion includes a first edge in the side of the first side surface, and
none of the plurality of pixels are arranged between the first edge and the first side surface.

15. The display device of claim 1, wherein
the band-shaped portion includes a second edge in the side of the second side surface,
the plurality of pixels include a third pixel that does not overlap with the transparent layer, and
the third pixel is arranged between the second edge and the second side surface.

16. A display device comprising:
a light emitting element;
a substrate having a first side surface opposed to the light emitting element, and a second side surface opposite to the first side surface;
a plurality of pixels;
a liquid crystal layer; and
a transparent layer arranged on the substrate and located between the substrate and the liquid crystal layer, and having a refractive index lower than a refractive index of the substrate, wherein
the transparent layer comprises a band-shaped portion extending from a side of the first side surface toward the second side surface,
the plurality of pixels include a first pixel, and a second pixel located between the first pixel and the second side surface,
a first area, where the first pixel overlaps with the transparent layer, is larger than a second area, where the second pixel overlaps with the transparent layer,
the transparent layer comprises a frame-shaped portion formed in a frame shape surrounding the band-shaped portion, and
none of the plurality of pixels overlap with the frame-shaped portion.

17. The display device of claim 16, wherein
the band-shaped portion includes a first edge in the side of the first side surface, and a second edge in a side of the second side surface, and
none of the plurality of pixels are arranged between the first edge and the first side surface or between the second edge and the second side surface.

18. The display device of claim 16, wherein
the frame-shaped portion includes a first portion along the first side surface, a second portion along the second side surface, and a third portion intersecting both the first portion and the second portion, and
a first width of the first portion is larger than a second width of the second portion and a third width of the third portion.

19. A display device comprising:
a light emitting element;
a substrate having a first side surface opposed to the light emitting element, and a second side surface opposite to the first side surface;
a plurality of pixels;
a liquid crystal layer; and
a transparent layer arranged on the substrate and located between the substrate and the liquid crystal layer, and having a refractive index lower than a refractive index of the substrate, wherein
the transparent layer comprises a band-shaped portion extending from a side of the first side surface toward the second side surface,
the plurality of pixels include a first pixel, and a second pixel located between the first pixel and the second side surface,
a first area, where the first pixel overlaps with the transparent layer, is larger than a second area, where the second pixel overlaps with the transparent layer,
the transparent layer comprises a frame-shaped portion formed in a frame shape surrounding the band-shaped portion,
the frame-shaped portion includes a first portion along the first side surface, a second portion along the second side surface, and a third portion intersecting both the first portion and the second portion, and
a first width of the first portion is different from at least one of a second width of the second portion and a third width of the third portion.

20. The display device of claim 19, wherein
the first width of the first portion is larger than the second width of the second portion and the third width of the third portion.

* * * * *